United States Patent
Wang et al.

(10) Patent No.: US 7,266,063 B2
(45) Date of Patent: Sep. 4, 2007

(54) OPTICAL POWER CALIBRATION METHOD ACCORDING TO A DATA WRITING LOCATION ONTO AN OPTICAL STORAGE CARRIER

(75) Inventors: Wai William Wang, Taoyuan (TW); Meng-Shin Yen, Taipei (TW); Tso-Tsai Chen, Taipei (TW)

(73) Assignee: BenQ Corporation, Taoyuan (TW)

( * ) Notice: Subject to any disclaimer, the term of this patent is extended or adjusted under 35 U.S.C. 154(b) by 500 days.

(21) Appl. No.: 10/050,750

(22) Filed: Jan. 16, 2002

(65) Prior Publication Data

US 2002/0110065 A1 Aug. 15, 2002

(30) Foreign Application Priority Data

Feb. 15, 2001 (TW) ............... 90103480 A

(51) Int. Cl.
*G11B 5/09* (2006.01)
*G11B 7/00* (2006.01)

(52) U.S. Cl. ............... 369/47.53; 369/53.24; 369/47.41

(58) Field of Classification Search .......... 369/47.53, 369/44.11, 53.24, 47.41
See application file for complete search history.

(56) References Cited

U.S. PATENT DOCUMENTS

| | | | | |
|---|---|---|---|---|
| 4,631,713 A | * | 12/1986 | Romeas et al. ........ | 369/47.53 |
| 5,005,089 A | * | 4/1991 | Thanos et al. .......... | 360/77.08 |
| 5,070,495 A | * | 12/1991 | Bletscher et al. ...... | 369/47.52 |
| 5,268,893 A | | 12/1993 | Call et al. | |
| 5,305,296 A | | 4/1994 | Kono | |
| 5,513,166 A | | 4/1996 | Tokumitsu et al. | |
| 5,687,156 A | * | 11/1997 | Hurst, Jr. ............... | 369/47.53 |
| 5,818,807 A | * | 10/1998 | Kuroda et al. .......... | 369/116 |
| 6,028,834 A | | 2/2000 | Kuroda et al. | |
| 6,052,347 A | * | 4/2000 | Miyata ................... | 369/47.53 |
| 6,067,284 A | * | 5/2000 | Ikeda et al. ............ | 369/116 |
| 6,418,102 B1 | * | 7/2002 | Suga ...................... | 369/47.53 |
| 6,711,107 B2 | * | 3/2004 | Chao et al. ............ | 369/47.52 |
| 6,728,177 B2 | * | 4/2004 | Seong et al. ............ | 369/47.4 |
| 7,002,885 B2 | * | 2/2006 | Wang et al. ............ | 369/47.53 |

FOREIGN PATENT DOCUMENTS

| | | |
|---|---|---|
| CN | 95197796 | 12/1995 |
| JP | 05-205342 | 8/1993 |
| JP | 08-147701 | 6/1996 |
| JP | 09-288825 | 11/1997 |
| JP | 10-293961 | 11/1998 |
| JP | 2000-099949 | 4/2000 |
| JP | 2000-235712 | 8/2000 |

* cited by examiner

*Primary Examiner*—Gautam R. Patel
(74) *Attorney, Agent, or Firm*—Snell & Wilmer L.L.P.

(57) ABSTRACT

A method is used for calibrating a writing power of an optical storage carrier player. The player has an access device for writing data onto the optical storage carrier. The carrier includes a center, an inner power calibration area (first calibration area), a data storage area, and an outer power calibration area (second calibration area). The method determines a writing location of the data in the data storage area, and controls the access device to perform an optical power calibration process in either the inner power calibration area or the outer power calibration area according to the writing location. Once completed, the method then utilizes a result of the optical power calibration process to determine a required writing power, and finally controls the access device to write the data to the optical storage carrier in the writing location with the required writing power.

6 Claims, 5 Drawing Sheets

OPTICAL POWER CALIBRATION METHOD ACCORDING TO A DATA WRITING LOCATION ONTO AN OPTICAL STORAGE CARRIER

CROSS REFERENCE TO RELATED APPLICATIONS

This application claims priority to Taiwan Patent Application Serial No. 090103480 entitled "Optical Power Calibration Method According to a Data Writing Location," filed 15 Feb. 2001.

BACKGROUND OF THE INVENTION

1. Field of the Invention

The present invention relates to an optical power calibration method, and more particularly, to an optical power calibration method for calibrating a writing power of an optical storage carrier player, such as a Compact Disc Read/Write drive, according to a data writing location optical storage carrier.

2. Description of the Prior Art

A Compact Disc Read/Write drive can write data to recordable compact discs that can subsequently be read in any Read-Only-Memory Compact Disc (CD-ROM) drive and in the CD-R/W drive. Generally, the CD-R/W drive performs an optical power calibration process before writing data onto a compact disc. The optical power calibration process pre-writes specific information onto a Power Calibration Area (PCA) located at an inside area of the compact disc. Next, the written information is read to determine a required writing power to write the data to the compact disc correctly.

Please refer to FIG. 1 of a schematic view of a compact disc 10 according to the prior art. The prior art compact disc 10, which is standardized according to an Orange Book, comprises a center 12, a Power Calibration Area 14 located outside of the center 12 for optical power calibration, and a data storage area 16 located outside of the Power Calibration Area 14. Data is written into the data storage area 16. Before writing data onto the compact disc 10, the prior art CD-R/W drive performs an optical power calibration process in the Power Calibration Area 14 to determine power parameters. That is, the prior art CD-R/W drive uses properties such as surrounding and vibrational characteristics of the Power Calibration Area 14 to simulate conditions within the whole data storage area 16 so as to determine the appropriate writing power.

Nevertheless, the Power Calibration Area 14 is located at an inside area of the compact disc 10, but a considerable portion of the data storage area 16 is located at an outside area of the compact disc 10. Since the surrounding and vibrational characteristics of the compact disc 10 have differences between the inside and the outside area, the prior art optical power calibration method is incapable of acquiring an optimum writing power, thus resulting in a bad writing quality.

SUMMARY OF THE INVENTION

It is therefore one aspect of the present invention to provide an optical power calibration method to solve the above-mentioned problem.

According to one aspect of the invention, the invention provides an optical power calibration method for calibrating a writing power of an optical storage carrier player, such as a Read/Write Compact Disc (CD/R/W) drive. The CD-R/W drive has an access device for writing data onto a compact disc. The optical storage carrier, such as the compact disc, comprises a center, an inner power calibration area (first power calibration area) located outside of the center for optical power calibration, a data storage area located outside of the inner power calibration area, and an outer power calibration area (second power calibration area) located outside of the data storage area for optical power calibration.

The optical power calibration method includes following steps: (a) providing data to be written, and (b) determining a writing location for the data in the data storage area. Finally, (c) controlling the access device to perform an optical power calibration process in either the inner power calibration area or the outer power calibration area according to the writing location. The access device performs the optical power calibration process in (a) the first power calibration area when the writing location is within the predetermined portion, or (b) the second power calibration area when the writing location is out of the predetermined portion. The calibration method then utilizes the result of the optical power calibration process to determine the required writing power, and controlling the access device to write the data to the compact disc in the writing location with the required writing power.

It is an advantage of the claimed invention that the optical power calibration method according to the claimed invention performs an optical power calibration process in either the inner power calibration area or the outer power calibration area according to the writing location of the data.

These and other objectives and advantages of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
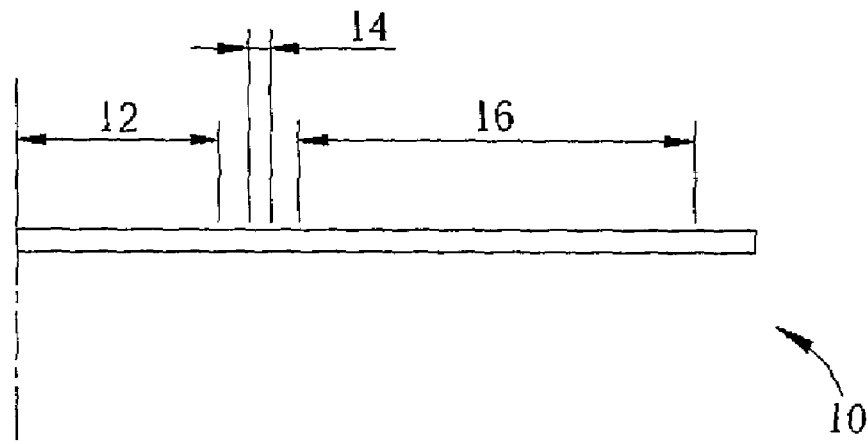
FIG. 1 is a schematic diagram of a compact disc according to the prior art.
Figure 2:
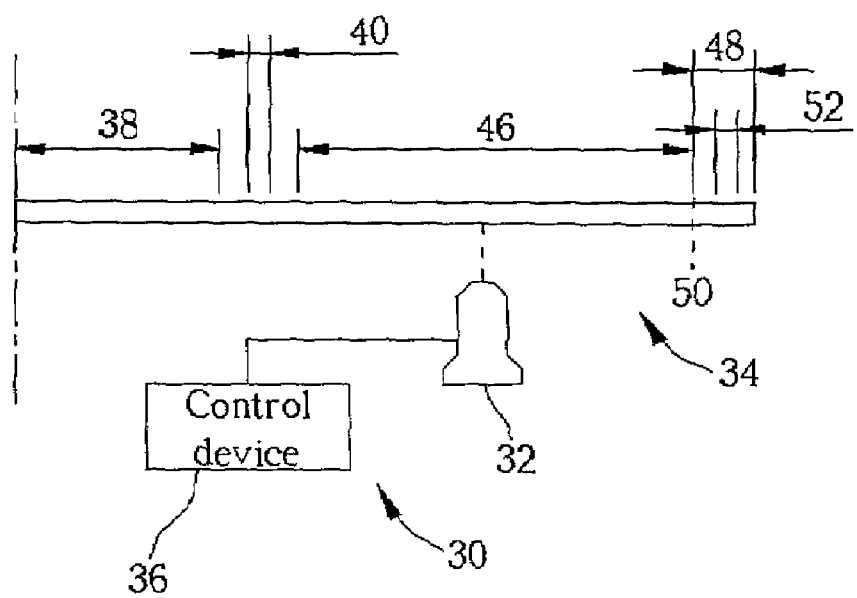
FIG. 2 is a schematic diagram of a Compact Disc Read/Write drive according to the present invention.

Please refer to FIG. 2 of a schematic diagram of a Compact Disc Read/Write drive 30 according to the present invention. The CD-R/W drive 30 comprises an access device 32 for writing data onto a compact disc 34, and a control device 36 for controlling operations of the CD-R/W drive 30. The control device 36 controls the access device 32 to perform an optical power calibration process, and utilizes a result of the optical power calibration process to write the data to the compact disc 34.

As shown in FIG. 2, from the inside to the outside, the compact disc 34 sequentially comprises a center 38, an inner power calibration area 40 for optical power calibration, a data storage area 46 where data is written, and a last possible lead-out area 48 for storing ending information about the data on the compact disc 34. According to a compact disc standard, the most outside area of each compact disc must remain an appropriate region for storing ending information about data, i.e., the last possible lead-out area 48. However, the optical power calibration process can be performed in the inner power calibration area 40 for one hundred times. In this invention, the extra outer power calibration area 52 is defined in the last possible lead-out area 48.

According to the compact disc standard mentioned in the Orange Book, the length of the last possible lead-out area 48 must be at least longer than 01:30:00, some manufacturers even manufacturer a compact disc with a last possible lead-out area of 01:50:00. Generally, fifteen frames are required to perform an optical power calibration process once. Thus 1,500 frames are required to perform the optical power calibration process one hundred times, which takes twenty seconds (00:20:00). Hence, enough length of the last possible lead-out area 48 is reserved for storing the ending information, and then the outer power calibration area 52 can utilize the rest of the lead-out area 48 for optical power calibration. In the preferred embodiment according to the present invention, the outer power calibration area 52 is located from 01:00:00 to 01:20:60 after a last possible start time 50.

Figure 3:
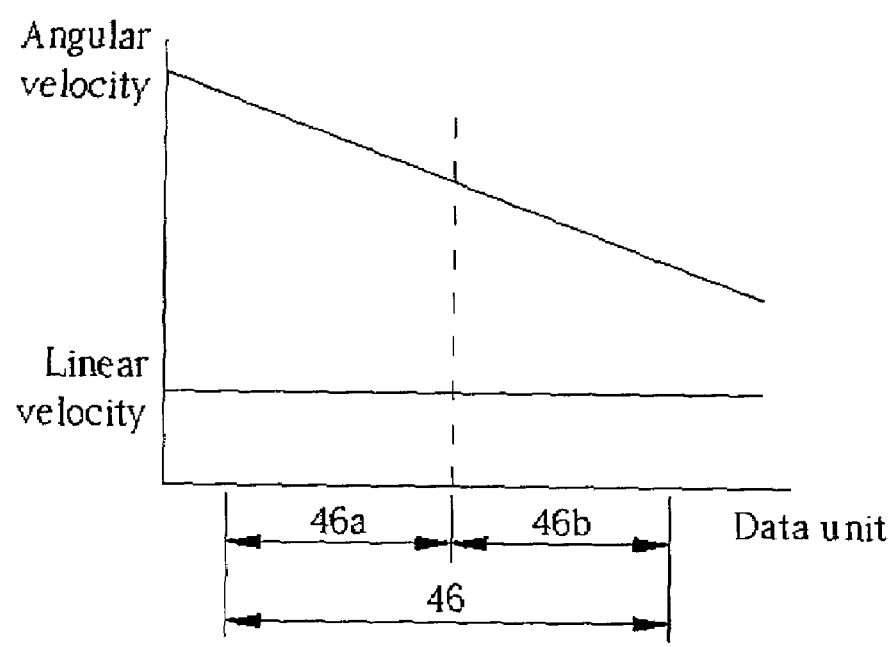
FIG. 3 is a schematic diagram for controlling of the CD-R/W drive shown in FIG. 2.

Please refer to FIG. 3 of a schematic diagram for controlling of the CD-R/W drive 30 shown in FIG. 2. In a preferred embodiment of the present invention, the CD-R/W drive 30 controls rotation of the compact disc 34 in a constant linear velocity (CLV) manner, so that data units on different tracks of the compact disc 34 have the same linear velocity while passing through the access device 32. From the point of view of an angular velocity of the compact disc 34, when writing onto data units near the center 38 of the compact disc 34, the compact disc 34 has a higher angular velocity. Oppositely, when writing onto data units near the outside area of the compact disc 34, the compact disc 34 has a lower angular velocity.

The CD-R/W drive 30 performs an optical power calibration process in either the inner power calibration area 40 or the outer power calibration area 52 according to a writing location of data. As shown in FIG. 3, the preferred embodiment of the present invention divides the data storage area 46 into an inner area 46a and an outer area 46b. When writing data, the control device 36 determines a writing location for the data into the data storage area 46. When the writing location is located within the inner area 46a, the CD-R/W drive 30 performs the optical power calibration process in the inner power calibration area 40 shown in FIG. 2. When the writing location is out of the inner area 46a, and located in the outer area 46b, the CD-R/W drive 30 performs the optical power calibration process in the outer power calibration area 52.

Figure 4:
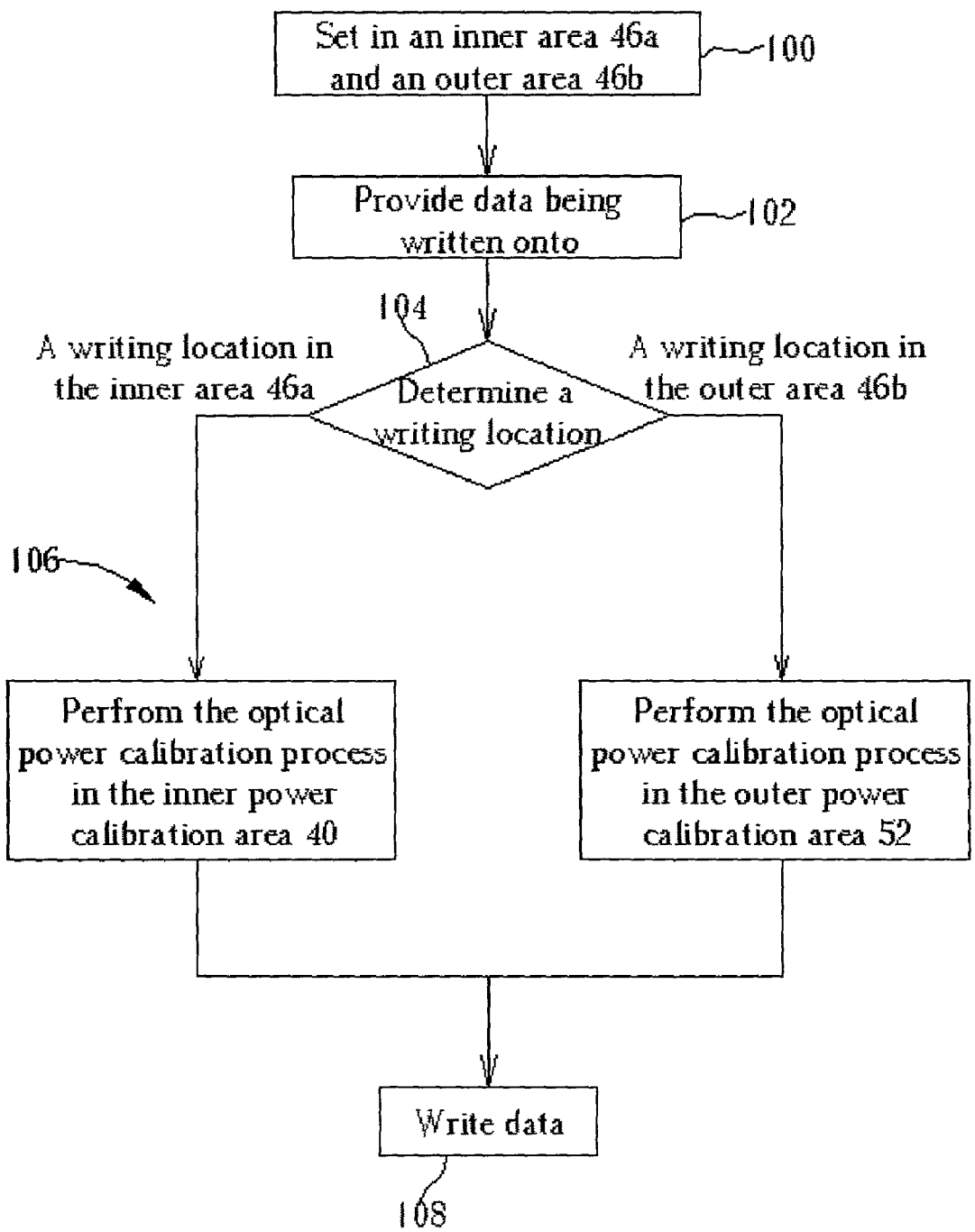
FIG. 4 is a flow chart of an optical power calibration method according to the preferred embodiment of the present invention.

Please refer to FIG. 4 of a flow chart of an optical power calibration method according to the preferred embodiment of the present invention. The optical power calibration method of the present invention comprises:

step 100: dividing the data storage area 46 into an inner area 46a and an outer area 46b;
step 102: providing data to be written;
step 104: determining a writing location of the data in the data storage area 46;
step 106: controlling the access device 32 to perform an optical power calibration process in either the inner power calibration area 40 or the outer power calibration area 52 according to the writing location. When the writing location is located in the inner area 46a, the access device 32 performs the optical power calibration process in the inner power calibration area 40. When the writing location is located in the outer area 46b, the access device 32 performs the optical power calibration process in the outer power calibration area 52;
step 108: controlling the access device 32 to write the data to the compact disc 34 in the writing location with the required writing power.

Since the inner area 46a is adjacent to the inner power calibration area 40, and the outer area 46b is adjacent to the outer power calibration area 52, the surrounding and vibrational characteristics of the inner area 46a and the outer area 46b are close to that of the inner power calibration area 40 and the outer power calibration area 52 respectively. Therefore, the optical power calibration method according to the present invention can precisely predict an optimum writing power in the data storage area 46 to enhance the writing quality.

In addition to the CLV manner described previously, the CD-R/W drive 30, which controls rotation of the compact disc 34 in a constant angular velocity (CAV) manner, is also applicable to the optical power calibration method of the present invention as well.

Figure 5:
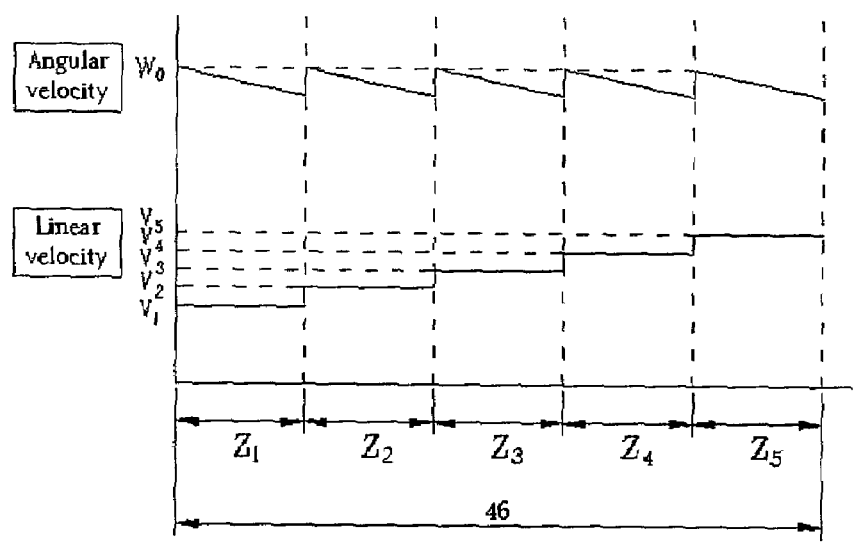
FIG. 5 is a schematic diagram of an alternative preferred embodiment of the present invention.

Please refer to FIG. 5 of a schematic diagram of an alternative preferred embodiment of the present invention. Different from the previously mentioned embodiment, the CD-R/W drive 30 does not control rotation of the compact disc 34 in a CLV manner or a CAV manner, but in a multi-stage linear velocity manner instead. As shown in FIG. 5, the data storage area 46 of the compact disc 34 is divided, from the inside to the outside, into five data segments $Z_1$, $Z_2$, $Z_3$, $Z_4$ and $Z_5$. The CD-R/W 30 controls rotation of the compact disc 34 in each segment $Z_1$, $Z_2$, $Z_3$, $Z_4$, $Z_5$ in a constant linear velocity (CLV) manner, each segment $Z_1$, $Z_2$, $Z_3$, $Z_4$, $Z_5$ has a different linear velocity $V_1$, $V_2$, $V_3$, $V_4$, $V_5$ respectively, but each segment $Z_1$, $Z_2$, $Z_3$, $Z_4$, $Z_5$ has the same initial angular velocity $W_0$.

In this preferred embodiment of the present invention, the control device 36 determines a writing location for data to be written into the data segment $Z_1$, $Z_2$, $Z_3$, $Z_4$, or $Z_5$ of the data storage area 46. It then controls the access device 32 to perform an optical power calibration process in either the inner power calibration area 40 or the outer power calibration area 52 according to the writing location. When the writing location is within the inner three data segment $Z_1$, $Z_2$, or $Z_3$ (the predetermined portion of the data storage area 46), the CD-R/W drive 30 controls the access device 32 to perform the optical power calibration process in the inner power calibration area 40. When the writing location is within the outer two data segment $Z_4$ or $Z_5$, the control device 36 controls the access device 32 to perform the optical power calibration process in the outer power calibration area 52.

Figure 6:
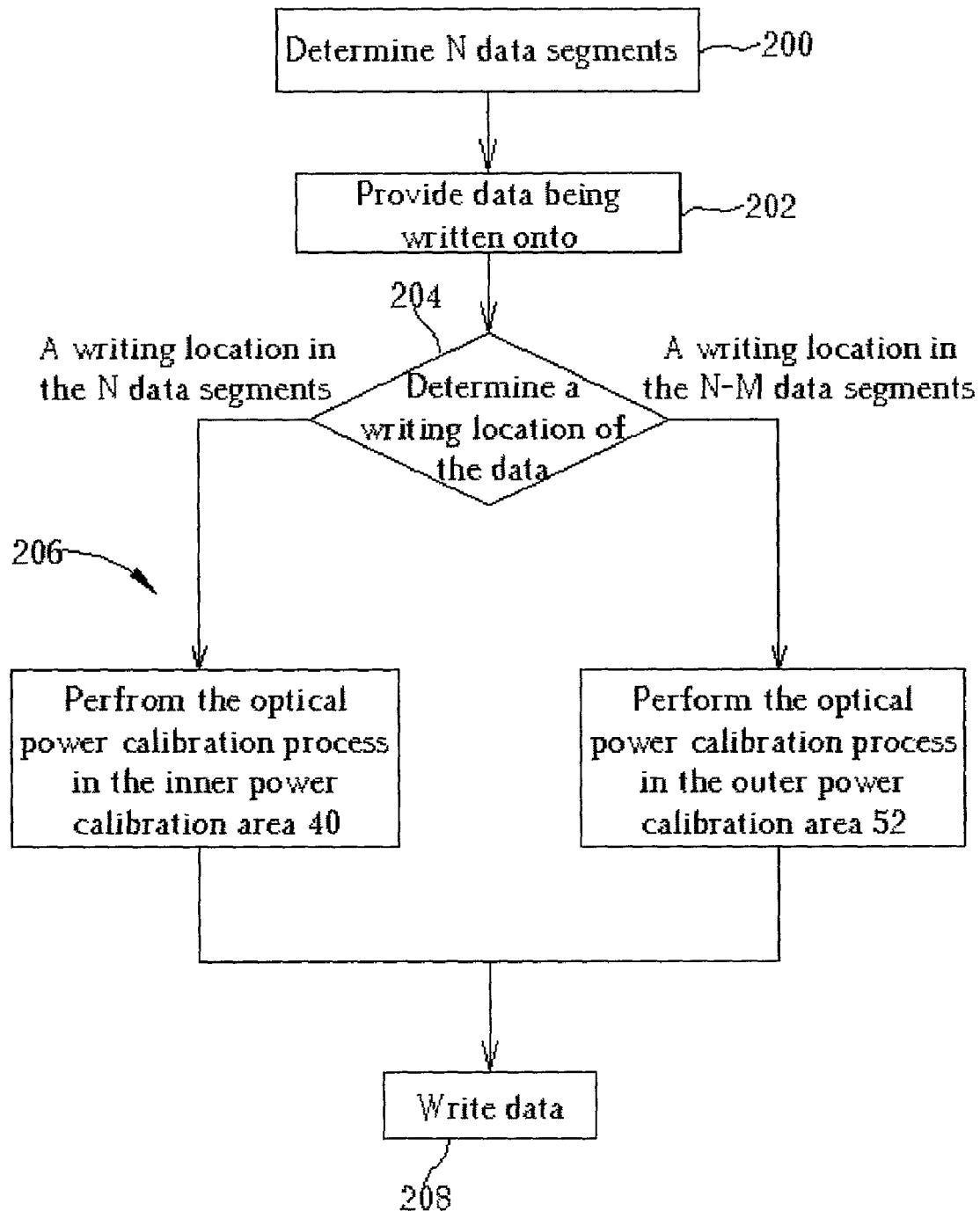
FIG. 6 is a flow chart of an optical power calibration method according to the preferred embodiment shown in FIG. 5.

Please refer to FIG. 6 of a flow chart of an optical power calibration method according to the preferred embodiment shown in FIG. 5. The optical power calibration method according to the preferred embodiment shown in FIG. 5 comprises:

step 200: providing N data segments $Z_1$ to $Z_N$ for controlling rotation of the compact disc 34 in a multi-stage linear velocity manner;
step 202: providing data to be written;
step 204: determining a writing location of the data in the data storage area 46;

step 206: controlling the access device 32 to perform an optical power calibration process in either the inner power calibration area 40 or the outer power calibration area 52 according to the writing location. When the writing location is located in the inner M (M<N) data segments ($Z_1$~$Z_M$), the access device 32 performs the optical power calibration process in the inner power calibration area 40. When the writing location is located in the outer N-M data segments ($Z_{M+1}$~$Z_N$), the access device 32 performs the optical power calibration process in the outer power calibration area 52;

step 208: controlling the access device 32 to write the data to the compact disc 34 in the writing location with the required writing power.

The M value can be a half of the N value. Naturally, to choose an optimum optical power calibration area according to the writing location, the M and N values can be defined depending on the relative factors.

In contrast to the prior art, the optical power calibration method according to the present invention performs the optical power calibration process in either the inner power calibration area or the outer power calibration area according to the writing location of data. Therefore an exact writing power for the data storage area 46 can be predicted precisely so as to enhance the writing quality.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An optical power calibration method for calibrating a writing power of an optical storage carrier player, the optical storage carrier player comprising an access device for writing data onto an optical storage carrier, the optical power calibration method comprising steps of:

setting a first power calibration area located outside a center of the storage carrier;

setting a data storage area located outside the first power calibration area;

setting a last possible lead-out area located outside the data storage area and at the outermost edge of the storage carrier for storing ending information about data written on the optical storage carrier;

setting a second power calibration area located within the last possible lead-out area, wherein the starting point of the last possible lead-out area and the starting point of the second power calibration area are disposed in a predetermined length to form a reserved area for storing ending information about data written on the optical storage area;

providing data to be written in the data storage area;

before writing the data in the data storage area, determining a writing condition of the data in the data storage area;

determining whether the determined writing condition in the data storage area is within a predetermined condition or not, and according to the determining result to select one of the first power calibration area and the second power calibration area to perform an optical power calibration process to determine a calibrated writing power; and controlling the access device to write the data in the data storage area with the calibrated writing power and writing the ending information in the reserved area.

2. The optical power calibration method of claim 1, wherein the data storage area is divided into an inner area and an outer area, the writing condition is the writing location of the data, and the predetermined condition is to determine if the writing location of the data is located within the inner area, when the writing location is located within the inner area, performing the optical power calibration process in the first power calibration area, and when the writing location is located in the outer area, performing the optical power calibration process in the second power calibration area.

3. The optical power calibration method of claim 1, wherein the carrier player controls rotation of the optical storage carrier in a constant linear velocity (CLV) manner.

4. The optical power calibration method of claim 1, wherein the carrier player controls rotation of the optical storage carrier in a constant angular velocity (CAV) manner.

5. The optical power calibration method of claim 1, wherein the data storage area comprises two data segments, and the carrier player controls rotation of the optical storage carrier in a constant linear velocity (CLV) manner when the access device writing data onto one data segment, and each data segment having a different linear velocity.

6. The optical power calibration method of claim 1, wherein the writing condition comprises a writing location of the data in the data storage area, and the predetermined condition comprises a predetermined portion of the data storage area.

* * * * *